Dec. 23, 1969   L. W. WIGHTMAN   3,484,934
METHOD OF MANUFACTURING DYNAMOELECTRIC MACHINE
Filed Aug. 28, 1967   2 Sheets-Sheet 1
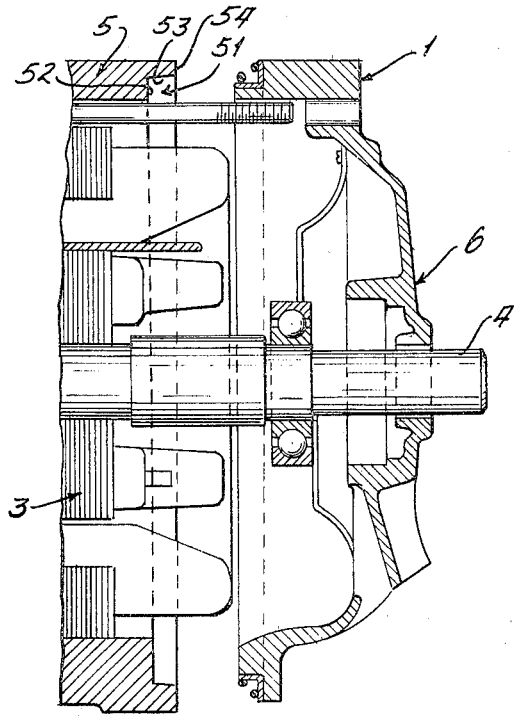
FIG.1
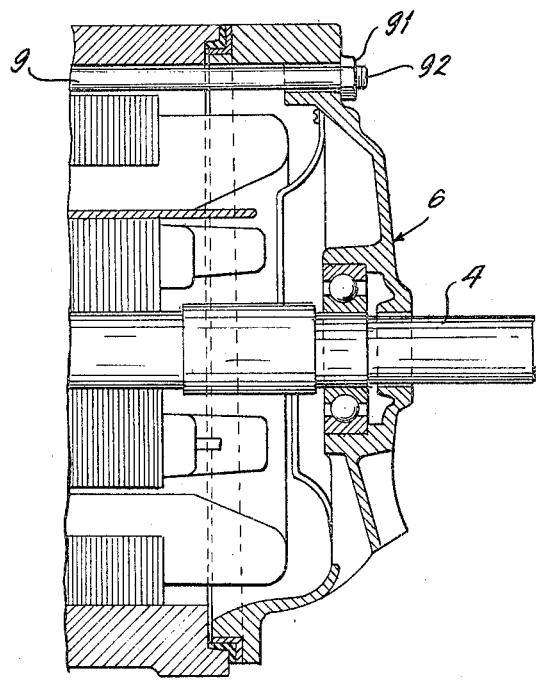
FIG.2
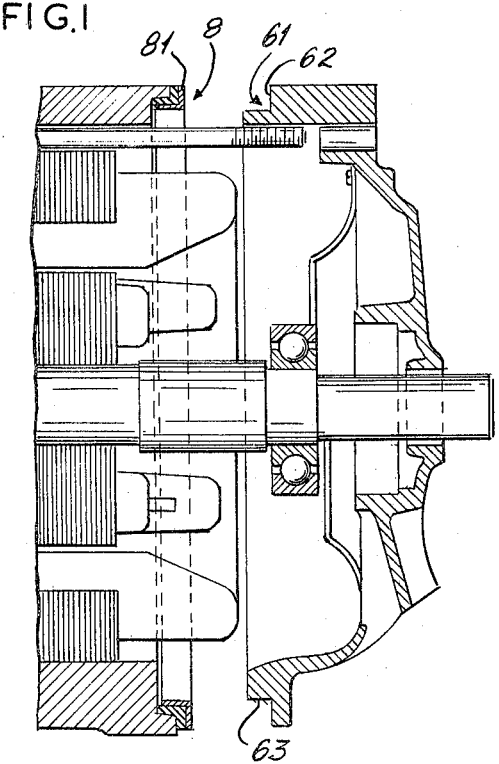
FIG.3
INVENTOR:
LAWRANCE W. WIGHTMAN
BY 
ATTORNEY.

Dec. 23, 1969  L. W. WIGHTMAN  3,484,934
METHOD OF MANUFACTURING DYNAMOELECTRIC MACHINE
Filed Aug. 28, 1967  2 Sheets-Sheet 2
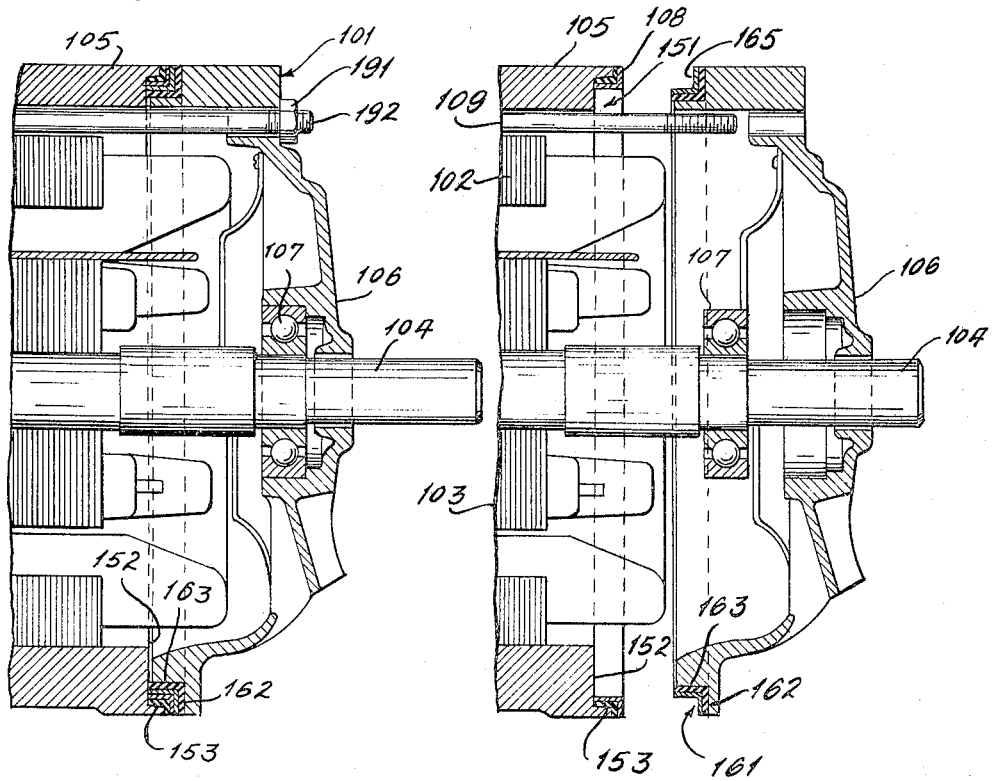
FIG.4  FIG.5
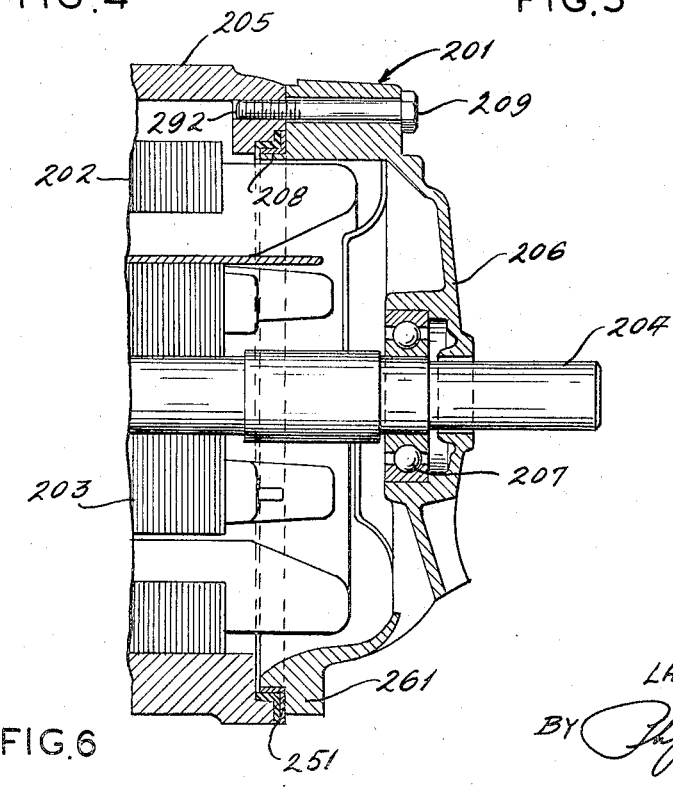
FIG.6
INVENTOR:
LAWRANCE W. WIGHTMAN
BY 
ATTORNEY.

United States Patent Office 3,484,934
Patented Dec. 23, 1969

3,484,934
METHOD OF MANUFACTURING DYNAMOELECTRIC MACHINE
Lawrance W. Wightman, St. Louis County, Mo., assignor to Emerson Electric Co., St. Louis County, Mo., a corporation of Missouri
Filed Aug. 28, 1967, Ser. No. 663,623
Int. Cl. H02k 15/00
U.S. Cl. 29—596                                    5 Claims

ABSTRACT OF THE DISCLOSURE

In making a dynamoelectric machine with a stator frame and at least one end shield, the frame and end shield being rabbeted complementarily, by a method in which the rotor is positioned within the stator by shims in the air gap, at least one locating ring is positioned between the complementary rabbets of the frame and end shield and is cemented to one of the frame and end shield while the end shield is mounted on the rotor shaft in its desired position. The locating ring is in snug engagement with the one of the frame and end shield to which it is not cemented or with another locating ring.

CROSS REFERENCE TO RELATED APPLICATION

This application is related in subject matter to an application of Harold D. Arnold, filed concurrenly herewith.

BACKGROUND OF THE INVENTION

This invention has particular application to larger electric motors, such as integral horsepower motors. Such motors usually are provided with a frame in the form of a heavy cylinder encircling the stator and projecting axially beyond the radial faces of the stator core, and end shields which are cast or molded. In the conventional motor of this sort, the frame and end shields have complementary closely interfitting rabbets machined on them to insure concentricity of the rotor and the stator bore. The end shields are commonly mounted against axial displacement by means of through bolts or studs, and the rabbets may be radially inboard or outboard of the mounting members.

The conventional method of construction has the advantage that the end shields can be removed and replaced for repair and replacement of elements of the motor but it is expensive and time-consuming. It has been proposed to locate the rotor and stator of large motors with respect to one another without machining a rabbet on an end shield, see Soames Patent No. 598,540, but in 1898 there was no easy way thereafter to secure the bearings or end shield to the frame. Recently fractional horsepower motors have been produced commercially by cementing end shields to the stator core while maintaining the desired air gap spacing with shims, which, after the cementing has been accomplished, are removed, However, this technique has not been applied to large motors.

One of the objects of this invention is to provide a construction of large dynamoelectric machines which combines the advantages of concentricity and narrow air gap of the cemented machine with the ease of disassembly and reassembly of the conventional machine.

Another object is to provide a method of producing such machines which is simpler and more economical than methods known heretofore.

Other objects will become apparent to those skilled in the art in the light of the following description and accompanying drawing.

SUMMARY OF THE INVENTION

In accordance with this invention, generally stated, a dynamoelectric machine with a frame and at least one end shield is provided with at least one locating ring cemented to one of the frame and end shield and in snug engagement with the other of the frame and end shield or with another locating ring. In the method of this invention, at least one locating ring is positioned between the end shield and frame, and while the end shield and frame are held in their desired ultimate configuration, the locating ring or rings is cemented in place.

Preferably the frame and end shield are both rabbeted, complementarily, and the locating ring is L-shaped, fitting the rabbet, and permitting both radial and axial location of the frame and end shield with respect to one another.

BRIEF DESCRIPTION OF THE DRAWING

In the drawing, FIGURE 1 is a fragmentary, longitudinal sectional view of one illustrative embodiment of dynamoelectric machine of this invention, illustrating a step in the method of its construction;

FIGURE 2 is a sectional view corresponding to that shown in FIGURE 1, illustrating a subsequent step in the method;

FIGURE 3 is a sectional view corresponding to the view shown in FIGURES 1 and 2, showing still a third step in the method;

FIGURE 4 is a fragmentary, longitudinal, sectional view of another embodiment of dynamoelectric machine of this invention in the process of its manufacture;

FIGURE 5 is a sectional view corresponding to the view shown in FIGURE 4, showing the motor of FIGURE 4 in partially disassembled condition; and FIGURE 6 is a fragmentary, longitudinal, sectional view of still another embodiment of dynamoelectric machine of this invention in the process of its manufacture.

DESCRIPTION OF THE PREFERRED EMBODIMENTS

Referring now to FIGURES 1 through 3 for one illustrative embodiment of dynamoelectric machine of this invention, reference numeral 1 indicates an integral horsepower electric motor with a wound stator 2, a rotor 3, a rotor shaft 4, a frame 5, and an end shield 6. Normally there will be two end shields 6 which, as far as the present invention is concerned, may be identical.

The frame 5 has a rabbet 51, defining a radial shoulder 52, an axial shelf 53, and a radial nose 54.

The end shield 6 carries a bearing 7 in the usual manner. The end shield has a rabbet 61 defining a radial shoulder 62 and an axial shelf 63. The shelf 63 of the rabbet 61 is radially inboard of the shelf 53 of the frame when the end shield 6 is mounted on the rotor shaft 4. A locating ring 8 is cemented by means of a suitable adhesive 81, such as an epoxy resin, to the stepped surfaces 52, 53 and 54 defined by the rabbet 51 of the frame 5, as shown particularly in FIGURE 3. The locating ring 8 engages the end shield rabbet shelf 63 snugly when the end shield and frame are assembled, as shown in FIGURE 2, but not so snugly as to preclude demounting of the end shield from the frame.

The end shield is mounted against axial displacement with respect to the frame by means of through bolts 9 with nuts 91 threadedly mounted on a threaded end 92 of the through bolt.

The locating ring 8 may be either blanked and drawn or, preferably, rolled from strip stock. It need not be, and preferably is not, continuous. If it is not continuous, it is preferably made slightly less in diameter than the shelf 63, and is sprung onto the shelf and pushed against the shoulder 62 of the end shield, in the first step of the assembly of the motor, as illustrated in FIGURE 1. If a sensible gap is produced in the locating ring in this operation, it can be filled wtih a parting material or bridged with a bit of cellophane tape, or it can be left, provided the cementing material is not so positioned as to be forced into the gap.

In the process, after the locating ring has been put into position on the end shield, cementing material is either put on in a continuous bead, or in selected areas, the rotor is centered, as with shims as shown in FIGURE 1, the end shield is placed on the rotor shaft and the through bolt nuts are tightened to the desired tension to hold the end shield in the exact configuration desired with respect to the frame. The cementing material is then cured, the shims 10 removed, and the motor is then fully assembled. The end shield can be demounted, as indicated in FIGURE 3, and remounted with exactly the concentricity as when it was assembled initially, the degree of concentricity being determined by the shims in the air gap.

It can be seen that neither rabbet 51 nor rabbet 61 need be machined precisely. In fact, if the casting is done with some precision, no machining at all is required.

Referring now to FIGURES 4 and 5 for another illustrative embodiment of dynamoelectric machine of this invention, reference numeral 101 indicates an integral horse power electric motor with a stator 102, a rotor 103, a rotor shaft 104, a frame 105, and an end shield 106. The end shield carries a bearing 107, and is mounted on the frame against axial movement by means of through bolts 109 each with a bolt 191 on a threaded end 192. The frame has a rabbet 151 with a radial shoulder 152, an axially extending shelf 153, and a radial nose 154. The end shield has a rabbet 161 defining a radial shoulder 162 as an axial shelf 163.

As in the embodiment shown in FIGURES 1–3, the rabbets 151 and 161 lie radially outboard of the through bolts.

In this embodiment, two locating rings are provided, a frame locating ring 108 and an end shield locating ring 165. Both locating rings are L-shaped. The stem and foot of the frame locating ring 108 are shorter than the corresponding stem and foot of the end shield locating ring 165, so that the locating rings nest snugly. It is, in fact, advantageous, in the process of producing the motor of this embodiment, to nest the rings 108 and 165 snugly as a first step. The cementing composition can then be applied either to the surfaces of the stator and end shield to be embraced by the rings, or to the exposed surfaces of the nested locating rings. The stator and rotor are located with respect to one another, as in the first embodiment, the end shield and frame are assembled as shown in FIGURE 4, and the cementing material is cured. The resulting motor can be disassembled as indicated in FIGURE 5, and the frame and end shield will again be concentric when they are reassembled in the same relative positions as they had during the process of cementing.

Referring to FIGURE 6, for still another embodiment of dynamoelectric machine of this invention, reference numeral 201 indicates an integral horse power electric motor with a wound stator 202, a rotor 203, a rotor shaft 204, a frame 205, and an end shield 206, carrying a bearing 207. In this embodiment, the end shield 206 is mounted on the frame 205 by means of studs 209, having a threaded end 292 threadedly engaging internal threads in a tapped hole in the frame. A frame rabbet 251 is radially inboard of the studs 209, as is an end shield rabbet 261. A locating ring 208 fits in snug engagement with an axial shelf of the rabbet 261, and is cemented to the stepped surfaces of the rabbet 251.

The method of manufacture of the motor of this embodiment is exactly the same as that of the embodiment shown in FIGURES 1 through 3.

In the manufacture of pairs of locating rings for the embodiment in which two nesting locating rings are used, if they are rolled from strip, they can be rolled simultaneously in nested condition, and left that way until they are installed.

In all of the illustrative embodiments shown and described, the axial location of the end shield and frame with respect to one another has been gauged by the abutment of the outer ring of the bearing against the shoulder of the bearing seat in the end shield, the inner ring being press fitted on the rotor shaft. It can be seen that if a predetermined amount of end play is desired, a shim, in the form of a thin washer, for example, can be put between the outer bearing ring and the shoulder of the bearing seat during the initial assembly process, and removed after the adhesive has set, simply by demounting the end shield and removing the shim manually.

Numerous variations in the construction and method of manufacture of the dynamoelectric machine of this invention within the scope of the appended claims will occur to those skilled in the art in the light of the foregoing disclosure. Merely by way of illustration, the locating ring in the embodiment shown in FIGURE 1 can be made to fit snugly into the rabbet 51 and to be cemented to the end shield rather than to the frame. The rabbets can have different configurations and dimensions, and if axial stop means are provided, can consist essentially of an annular circumferential surface, although this poses problems which the preferred embodiment does not. The frame and end shields can also be differently configured, even in transverse cross-section, although conventionally large dynamoelectric machines have stators and frames circular in transverse cross-section. These variations are merely illustrative.

Having thus described the invention, what is claimed and desired to be secured by Letters Patent is:

1. The method of making a dynamoelectric machine having a stator and a rotor, a stator-embracing frame, and at least one end shield, an axial surface on said frame and end shield lapping one another, said method comprising fitting a locating ring in snug but demountable engagement with one of said surfaces, introducing a permanent adhesive to the other of said surfaces and an exposed surface of the locating ring, assembling the end shield and frame in their desired relative configuration and setting the said adhesive thereby cementing said locating ring to the said other of said surfaces.

2. The method of claim 1 including the steps of press fitting a bearing on the shaft of said rotor, positioning the rotor with respect to the stator and moving said end shield axially toward the frame until the said bearing engages a stop surface on said end shield, whereby the axial location of said end shield and frame with respect to one another is gauged by said engagement of said bearing.

3. The method of claim 2 wherein the stop surface is provided by shim means and said shim means is subsequently removed to provide a predetermined amount of end play for the rotor.

4. A method of making a dynamoelectric machine having a stator and a rotor, a stator-embracing frame, and at least one end shield, an annular axially extending surface on said frame and an annular axially extending surface on said end shield lapping one another and spaced radially from one another, said method comprising internesting two locating rings in snug but demountable engagement, positioning said locating rings between said lapping surfaces, and, while holding the end shield and frame in desired configuration with respect to one another and the locating rings in their internested condition, adhering one of the said locating rings to one of said axially extending surfaces and the other of said locating rings to the other of said axially extending surfaces.

5. The method of claim 4 including the step of rolling the two locating rings from strips of metal simultaneously in internested condition.

References Cited

UNITED STATES PATENTS

| | | | |
|---|---|---|---|
| 3,043,147 | 7/1962 | Will | 29—596 |
| 3,167,672 | 1/1965 | Tupper | 310—90 |
| 3,320,660 | 5/1967 | Otto | 29—596 |

JOHN F. CAMPBELL, Primary Examiner
CARL E. HALL, Assistant Examiner

U.S. Cl. X.R.

310—42, 90, 258